(12) United States Patent
Fangmeier

(10) Patent No.: US 8,919,373 B2
(45) Date of Patent: Dec. 30, 2014

(54) VALVE

(75) Inventor: Martin Fangmeier, Auggen (DE)

(73) Assignee: Neoperl GmbH, Mullheim (DE)

( * ) Notice: Subject to any disclaimer, the term of this patent is extended or adjusted under 35 U.S.C. 154(b) by 437 days.

(21) Appl. No.: 13/379,850

(22) PCT Filed: Jun. 18, 2010

(86) PCT No.: PCT/EP2010/003678
§ 371 (c)(1),
(2), (4) Date: Dec. 21, 2011

(87) PCT Pub. No.: WO2010/149313
PCT Pub. Date: Dec. 29, 2010

(65) Prior Publication Data
US 2012/0138839 A1 Jun. 7, 2012

(30) Foreign Application Priority Data

Jun. 24, 2009 (DE) .......................... 10 2009 030 182

(51) Int. Cl.
*F16K 21/08* (2006.01)
*F16K 21/10* (2006.01)
*G05D 7/01* (2006.01)

(52) U.S. Cl.
CPC ...................................... *G05D 7/016* (2013.01)
USPC .................. 137/539.5; 137/454.6; 137/514.5; 137/514.7; 137/536; 137/537; 239/571; 239/587.3

(58) Field of Classification Search
USPC ............. 137/454.2, 454.6, 514.5, 514.7, 515, 137/533.17, 533.19, 533.31, 536, 537, 539, 137/539.5, 543.21; 239/571, 587.3
See application file for complete search history.

(56) References Cited

U.S. PATENT DOCUMENTS

| | | | | |
|---|---|---|---|---|
| 511,646 A * | 12/1893 | O'Byrne | ........................ | 137/539 |
| 1,701,305 A * | 2/1929 | Meyers | ...................... | 137/539.5 |
| 2,318,962 A * | 5/1943 | Parker | ......................... | 137/514.5 |
| 2,318,963 A * | 5/1943 | Parker | ......................... | 137/514.7 |
| 2,583,295 A * | 1/1952 | Greer et al. | ................. | 137/514.7 |
| 3,053,270 A * | 9/1962 | Campbell | .................... | 137/539.5 |
| 4,082,225 A * | 4/1978 | Haynes | .................... | 239/571 |
| 4,321,940 A * | 3/1982 | Krechel et al. | ............. | 137/514.7 |
| 4,467,964 A | 8/1984 | Kaeser | | |
| 5,333,791 A * | 8/1994 | Carlo | .............. | 239/571 |
| 5,513,802 A * | 5/1996 | Ueki | ............... | 239/571 |
| 7,201,184 B2 * | 4/2007 | Morrow et al. | ................ | 137/536 |
| 7,464,885 B1 * | 12/2008 | Chang | ........................... | 239/571 |
| 2011/0139904 A1 * | 6/2011 | Xu et al. | ..................... | 239/587.3 |

FOREIGN PATENT DOCUMENTS

| | | |
|---|---|---|
| CH | 46886 | 5/1910 |
| DE | 102006057787 | 5/2008 |
| EP | 1780452 | 5/2007 |

\* cited by examiner

*Primary Examiner* — John Rivell
(74) *Attorney, Agent, or Firm* — Volpe and Koenig, P.C.

(57) ABSTRACT

A valve (101) that can be used as a pressure limiter, for example in a sanitary supply line. The valve (101) according to the invention includes a valve housing (1), a fluid line piece (2) being provided in the housing interior thereof, the downstream side circumferential edge area thereof forming a valve seat (3) for a valve body (4), wherein the valve body (4) can be displaced between an open position and a closed position, in which closed position the valve body (4) acts on the downstream circumferential edge area of the fluid line piece (2), by the pressure of the fluid flowing in through the fluid line piece (2) on one side, and a downstream side pressure acting on the valve body (4) opposite to the regular flow-through direction on the other side.

12 Claims, 8 Drawing Sheets

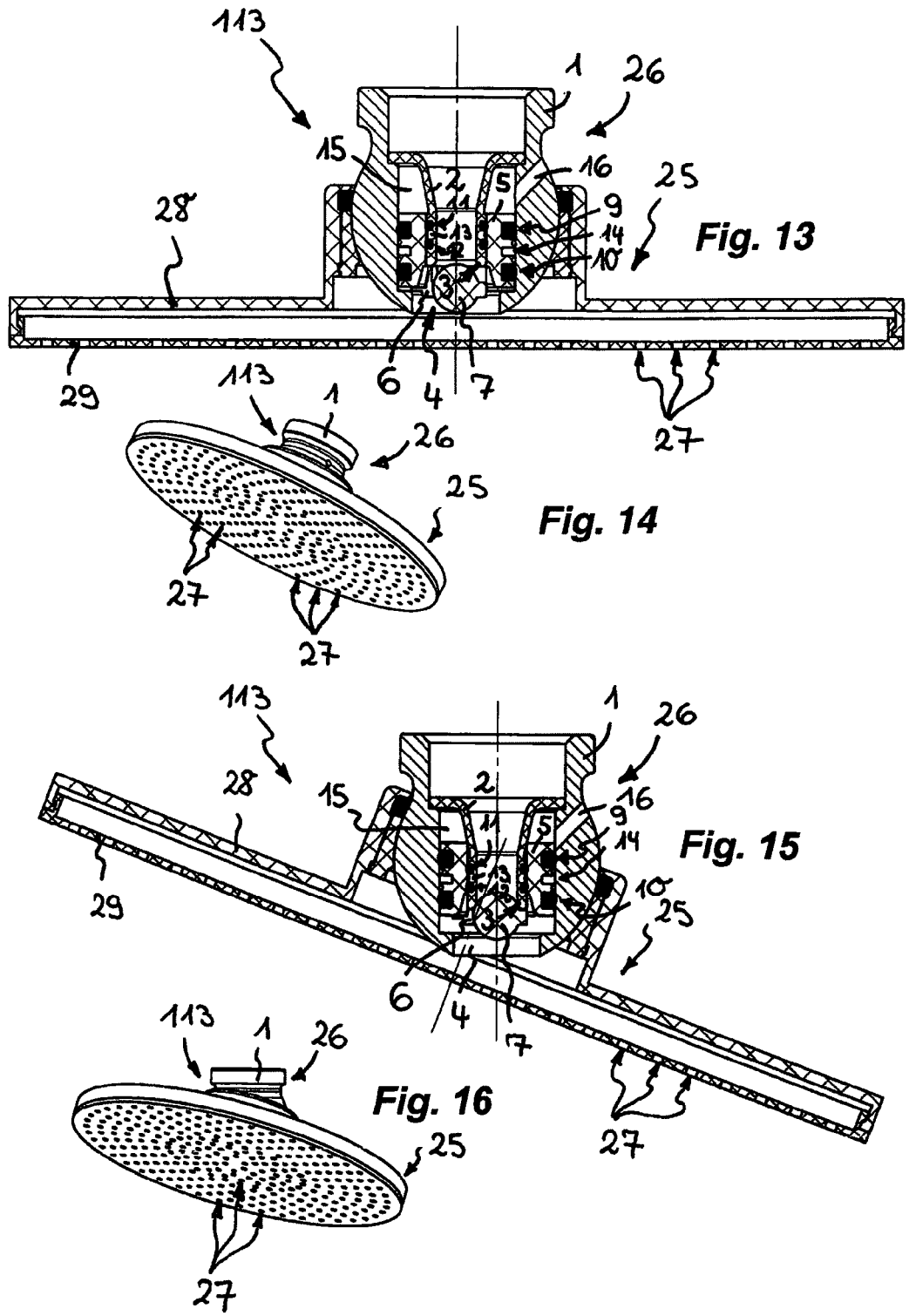

VALVE

BACKGROUND

The present invention relates to a valve having a valve housing, in the interior space of which is provided a fluid line piece whose outflow-side circumferential edge region forms a valve seat for a valve body, which valve body can be moved between an open position and a closed position by firstly the pressure, which acts on the valve body, of the fluid flowing in through the fluid line piece and secondly by a counterpressure, in which closed position the valve body acts on the outflow-side circumferential edge region of the fluid line piece.

For the operation of pressure-sensitive and in particular non-pressurized hot water generators, special outlet fittings are generally required which do not subject the water flowing through the supply line to an excessive resistance, and which thereby prevent an undesired pressure rise. For example, in conjunction with pressure-sensitive water generators, it is generally only possible to use non-aerated jet regulators, and therefore hot water outlets which do not generate a counterpressure.

Sanitary shower spray heads which have a spray head with a large spray surface area with a multiplicity of relatively small spray openings are becoming increasingly popular. With such shower spray heads it is possible to generate a shower jet pattern formed from a multiplicity of fine, thread-like individual jets. It is however disadvantageous that the spray openings, which have a relatively small clear cross section, can easily become blocked by limescale and dirt accumulations. As the spray openings become increasingly blocked, there is an increasing risk of the water flowing into the shower head causing a build-up of pressure which may lead to deformation and ultimately fracture of the spray head.

CH 46 886 A has previously described an actuating valve which is designed as an automatic pressure regulator and which has a valve housing, in the interior space of which is arranged a fluid line piece referred to as an inner housing. Whereas a pipe stub opens into the fluid line piece at the inflow side, the outflow-side circumferential edge region of the fluid line piece forms a valve seat for a plate-shaped valve body. The valve body is connected via a rod which leads coaxially through the fluid line piece to a first piston which is displaceably guided in the fluid line piece and to a second piston which seals off the valve housing. The second piston is acted on by a compression spring whose pressure can be varied by the adjustment of a threaded journal. The pressurized medium to be conducted through the already-known pressure regulator passes through said pipe stub into the fluid line piece, and from there through the valve seat into the valve housing. As a result, the second piston is pushed against the compression spring, wherein the valve moves more or less toward the closed position until the spring pressure and the medium pressure reach equilibrium. For as long as said equilibrium is maintained, the position of the valve also remains unchanged, such that the inflow of the medium into the valve housing is uniform. If the pressure of the entering medium is greater than the spring pressure, then the valve body moves toward the valve seat on the fluid line piece, possibly until the valve seat is completely closed, whereas in the reverse situation, the second piston is pushed by the compression spring against the fluid line piece referred to as an inner housing, and as a result the valve body is pushed away from the closed position at the valve seat. As a result of adjustment of the threaded journal, the compression spring can be compressed to a greater or lesser extent, and as a result the pressure of the medium emerging from the valve housing can be varied.

SUMMARY

It is the object to provide a structurally simple device, manufacturable with low cost and of compact design, which in a fluid technology application, for example in a sanitary component, counteracts an excessive rise in the internal pressure, which may generally at a maximum reach the system pressure.

This object is achieved according to the invention in that the counterpressure acts on the valve body counter to the regular throughflow direction, in that the guide path of the sliding guide assigned to the valve body is bounded by the housing inner circumference of the valve housing and the outer circumference of the fluid line piece, in that the valve body has at least one annular sliding piece, which is displaceably guided in the sliding guide, and a closure piece which acts on the valve seat in the closed position, and in that the closure piece and the sliding piece are connected to one another by means of connecting webs which delimit throughflow openings therebetween.

The valve according to the invention has a valve housing, in the interior space of which is provided a fluid line piece. The outflow-side circumferential edge region of the fluid line piece forms a valve seat for a valve body. The valve body can be moved between an open position and a closed position by firstly the pressure, which acts on the valve body, of the fluid flowing in through the fluid line piece and secondly by a counterpressure acting on the valve body counter to the regular throughflow direction. The valve body changes its relative position with respect to the valve seat as a function of the pressures and counterpressures acting in opposite directions on the valve body, in such a way that the valve opening remaining between the valve body and the valve seat can be varied in accordance with a counterpressure which builds up. In the closed position of the valve, the valve body acts on the outflow-side circumferential edge region of the fluid line piece and provides a sealing action there, such that the pressure at the outflow side can increase no further. Since the valve according to the invention varies its valve opening as a function of the pressures and counterpressures acting in opposite directions on the valve body, the valve according to the invention reacts rapidly to a pressure building up at the outflow side. Since the valve according to the invention moves into its closed position in the event of a significantly rising pressure at the outflow side, pressure-induced malfunctions and damage are effectively counteracted.

The valve body of the valve according to the invention can move in a closed linear guide. For this purpose, it is provided according to the invention that the guide path of the sliding guide assigned to the valve body is bounded by the housing inner circumference of the valve housing and the outer circumference of the fluid line piece. To permit a very compact and space-saving design of the valve according to the invention, it is provided that the valve body has at least one annular sliding piece, which is displaceably guided in the sliding guide, and a closure piece which acts on the valve seat in the closed position. Here, the closure piece may form that partial region of the valve body which is at the rear in the flow direction, while the sliding piece is displaceably guided in the annular chamber provided between the outer circumference of the fluid line piece and the housing inner circumference.

To be able to connect the sliding piece, which is displaceably guided in the annular chamber between the housing inner circumference and the outer circumference of the fluid line piece, to the closure piece situated in the region of the valve seat, it is provided according to the invention that the closure piece and the sliding piece are connected to one another by means of connecting webs which between them delimit the throughflow openings.

Uniform pressure-dependent functioning of the valve according to the invention is promoted if the valve body and in particular the closure piece thereof has a spherical shape and/or, at least in the partial region which acts on the valve seat, a spheroidal or rounded shape.

To delimit the sliding travel of the valve body situated in the interior of the valve housing, it is advantageous for the sliding travel of the valve body to be delimited by at least one stop in the valve housing, which stop interacts with a counterpart stop on the valve body, and for the stop to be designed preferably as an annular shoulder provided on the housing inner circumference, and/or for the counterpart stops to be arranged in particular on the connecting webs. The stop and the counterpart stop define the position of the valve body in the open position of the valve.

The valve according to the invention can react particularly sensitively and easily even to slight pressure changes or counterpressures if at least one ring seal or slide ring seal is provided between the housing inner circumference and the valve body and/or between the valve body and the outer circumference of the fluid line piece.

Fault-free functioning of the valve according to the invention is promoted if two ring seals or slide ring seals, which are spaced apart from one another, are provided on the sliding piece and/or on the outer circumference of the fluid line piece, between which ring seals or slide ring seals there is provided at least one annular groove formed as a grease chamber.

The at least one ring seal or slide ring seal may, in a particularly straightforward embodiment, be designed as a sealing ring. A preferred embodiment of the invention, however, provides that at least one ring seal or slide ring seal is designed as a lip seal. If at least one ring seal or slide ring seal is designed as a lip seal which provides sealing between the housing inner circumference and the valve body and/or between the valve body and the outer circumference of the fluid line piece, sticking effects, which may possibly arise over time with sealing rings, are avoided. The reduced adhesion of a lip seal of said type offers the advantage that the valve body can move more freely in the valve housing.

Here, an embodiment is preferable in which the at least one lip seal is held in an annular groove provided on the valve body circumference, and bears sealingly with the free circumferential edge region of at least one sealing lip against the housing inner circumference.

It is possible for the valve body situated in the valve housing to only be moved firstly by the pressure of the fluid flowing in in the throughflow direction and secondly by a counterpressure building up in the opposite direction. A preferred embodiment of the invention provides, however, that the valve body can be moved from its starting position into its open position and/or into the closed position counter to a restoring force. With such a preferred embodiment, the valve body is held in a preferred starting position so as to move counter to the restoring force in the event of a change in the pressure conditions in the valve housing. The restoring force may hold the valve body in a preferred closed position or a preferred open position—depending on which side from which said restoring force acts on the valve body. If restoring forces act on the valve body at both sides thereof, and if the valve body is held in a preferred intermediate position by the restoring forces, the valve body can move either in the direction of the predominant closed position or in the direction of the open position as a function of the respective pressure difference, as a result of which the at least one ring seal or slide ring seal is exercised, and as a result of which an adhesion of said seal is counteracted.

Here, a straightforward embodiment of the invention which can be produced with little outlay provides that at least one rubber-elastic or resiliently elastic element serves to provide a restoring force.

The versatility of the valve according to the invention is promoted if the valve housing is designed as a cartridge housing.

To ensure that an enclosed air cushion does not build up in the annular chamber bordering the sliding travel, which air cushion could possibly uncontrolledly counteract the counterpressure controlling the valve, it is advantageous for the valve housing, in the inflow-side partial region of the sliding guide, to be designed to be open to the atmosphere.

In a preferred embodiment of the invention, the valve is designed as a pressure limiter. Such a valve which is designed as a pressure limiter may advantageously be used for example in a non-pressurized water heater, a coffee machine, an automated beverage dispenser or also in a shower head.

One refinement of the invention provides that an aerated jet regulator is positioned downstream of the valve in the flow direction, which jet regulator is preferably arranged in the water outlet of a sanitary outlet fitting. This outlet fitting may if appropriate also be the spray head of a handheld or kitchen spray head which can be switched between a spray function and an aerated water or single jet. Since the valve which serves as a pressure limiter counteracts a pressure rise which exceeds a defined internal pressure, it is also possible thanks to the valve according to the invention for an aerated jet regulator to be installed, even though said aerated jet regulator, owing to its function, builds up a counterpressure.

BRIEF DESCRIPTION OF THE DRAWINGS

Refinements of the invention will emerge from the claims in conjunction with the drawing. The invention will be explained in more detail below on the basis of advantageous exemplary embodiments.

In the drawing:

FIG. 13 shows, in a longitudinal section, an assembly which is comprised of a shower spray head and a ball joint, into which assembly a valve is integrated, which serves as a pressure-reducing means, as per FIGS. 1 to 12, FIG. 14 shows the assembly from FIG. 13 in a perspective side view, FIG. 15 shows, in a longitudinal section, the assembly from FIGS. 13 and 14 in the closed position of its valve which serves as a pressure-reducing means, wherein the shower spray head is held here in a pivoted position by means of the ball joint, FIG. 16 shows, in a perspective view, the assembly from FIGS. 13 to 15 in the pivoted position as per FIG. 15.

DETAILED DESCRIPTION OF THE PREFERRED EMBODIMENTS

Figure 2:
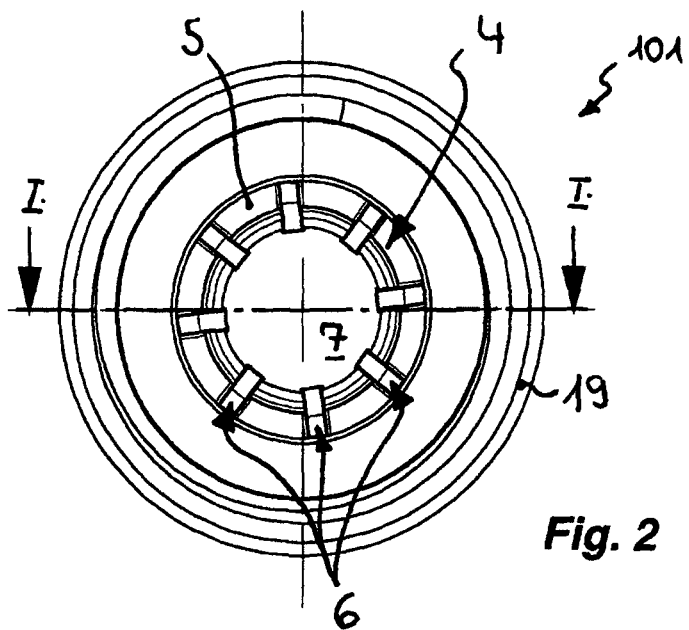
FIG. 2 shows the valve from FIG. 1 in a plan view of its outflow side.

FIGS. 1 to 18 show various embodiments 101, 105 and 113 and 117 of a valve which can be used as a pressure limiter and which, in the exemplary embodiments shown here, can be inserted into a sanitary water line. Each of the valve embodiments 101, 105, 113 and 117 shown here has a valve housing 1, in the interior space of which is provided a fluid line piece 2 whose outflow-side circumferential edge region forms a valve seat 3 for a valve body 4. The valve body 4 can be moved between an open position and a closed position firstly by the pressure, which acts on the valve body 4, of the fluid flowing in through the fluid line piece 2 and secondly by a counterpressure acting on the valve body 4 counter to the regular throughflow direction.

Whereas the valve embodiments 101, 105, 113 and 117 are shown in the open position of the valve in FIGS. 1, 2, 5, 6, 9, 10, 13, 17 and 18, said valve embodiments 101, 105 and 113 are shown in the closed position in FIGS. 3, 4, 7, 8, 11, 12 and 15. In the closed position shown in FIGS. 3, 4, 7, 8, 11, 12 and 15, the valve body 4 acts on the outflow-side circumferential edge region of the fluid line piece 2.

From the longitudinal sections in FIGS. 1, 3, 5, 7, 9, 11, 13, 15 and 17, it can be seen that the housing inner circumference of the valve housing 1 is designed as a sliding guide for the valve body 4. Here, the guide path of the sliding guide assigned to the valve body 4 is bounded by the housing inner circumference of the valve housing and the outer circumference of the fluid line piece 2.

The valve body 4 of the valve embodiments 101, 105, 113 and 117 shown here has a sliding piece 5 which is displaceably guided in the sliding guide and which—as is the case here—may be of annular design. The sliding piece 5 is connected by means of a plurality of connecting webs 6, which are preferably spaced apart uniformly from one another in the circumferential direction, to a closure piece 7, wherein the connecting webs 6 between them delimit throughflow openings. Here, the closure piece 7 is of spherical design and thus has, in its partial region facing towards the valve seat 3, a rounded outer contour which promotes centering of the valve body 4 during the closing movement of the valve.

The sliding travel of the valve body 4 is delimited in the closed position by the valve seat 3 bearing against the circumference of the valve body 4. In the other movement direction of the valve body 4, the sliding travel is delimited by at least one stop in the valve housing 1, which stop interacts with a counterpart stop on the valve body 4. Here, the stop is designed as an annular shoulder 8 provided on the housing inner circumference.

In the longitudinal sections of FIGS. 1, 3, 5, 7, 9, 11, 13 and 15, it can be seen that at least one ring seal or slide ring seal is provided between the housing inner circumference and the valve body 4 and between the valve body 4 and the outer circumference of the fluid line piece. For this purpose, there are provided on the sliding piece 5 on the one hand and on the outer circumference of the fluid line piece 2 on the other hand in each case two ring seals 9, 10 and 11, 12 which are held in corresponding annular grooves. Between the annular grooves which are spaced apart from one another and which hold the ring seals 9, 10 and 11, 12 there is provided in each case one further annular groove 13 and 14 which is formed as a grease chamber and which is intended to ensure a low-friction sliding movement of the valve body 4 in its sliding guide even over a relatively long period of time.

Figure 18:
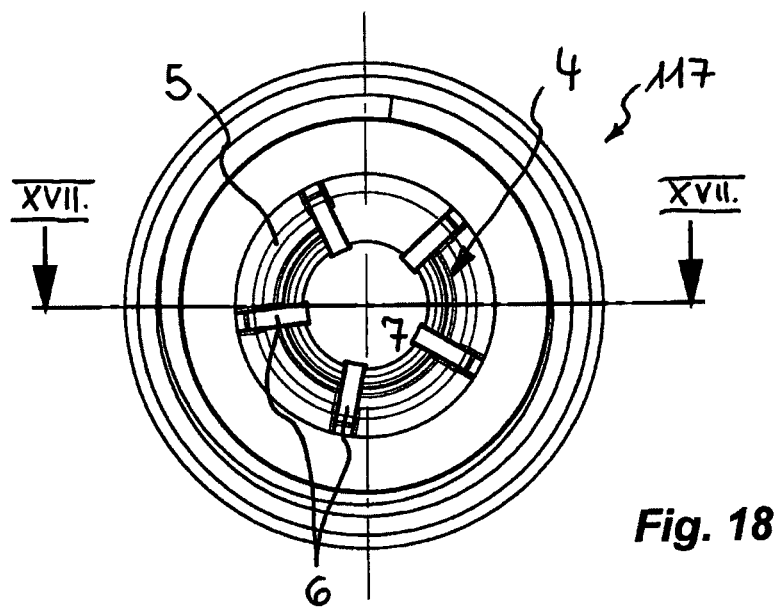
FIG. 18 shows the valve from FIG. 17 in a plan view of its outflow side.
Figure 17:
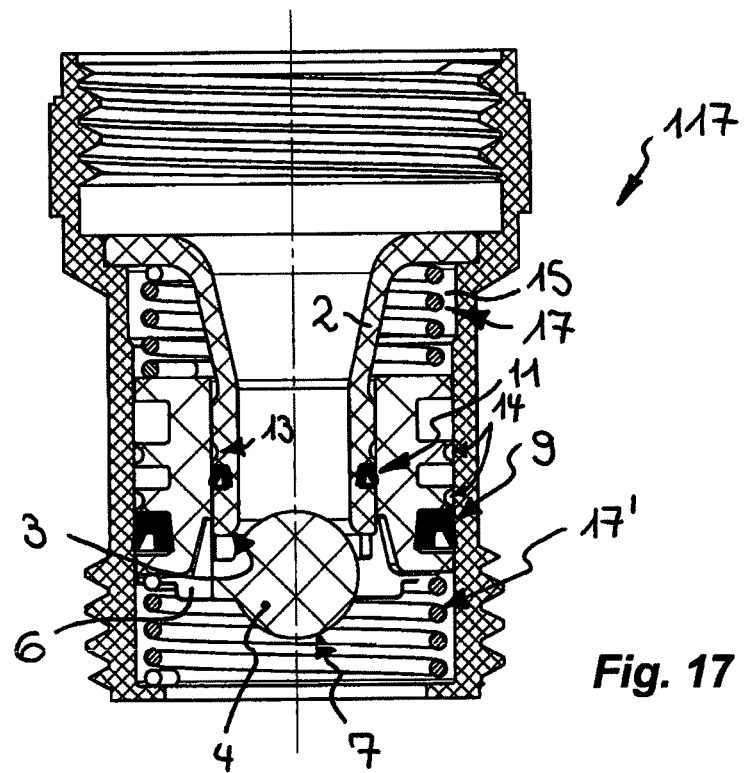
FIG. 17 shows, in longitudinal section in the section plane XVII-XVII from FIG. 18 and in its open position, a valve which is designed as a pressure limiter and in which the slide ring seal provided on the valve body is designed as a lip seal, wherein the valve body is acted on at both sides by restoring springs or similar restoring forces which hold the valve body in a preferred intermediate position.

Whereas the ring seals 9, 10 and 11, 12 provided in the valves 101, 105 and 113 are designed as sealing rings, the valve shown in FIGS. 17 and 18 has, firstly on the sliding piece 5 and secondly on the outer circumference of the fluid line piece 2, in each case only one ring seal 9 and 11 respectively, which are designed here as lip seals. By means of said lip seals 9, 11, sticking effects, which may possibly arise over time with sealing rings, are avoided. The reduced adhesion of the lip seals 9, 11 offers the advantage that the valve body 4 can move more freely in the valve housing 1. The ring seals 9, 11 provided in the valve 117 are also held in corresponding annular grooves. Here, on the inflow side of said annular grooves, there is provided in each case one further annular groove 13 or 14 which is formed as a grease chamber and which is likewise intended to ensure a low-friction sliding movement of the valve body 4.

The valve body 4 can, by means of the pressure forces acting in opposite directions, be moved and positioned between its open position and its closed position such that the valve opening remaining between the valve body 4 and the valve seat 3 can be varied in accordance with a counterpressure building up on the outflow side of the valve. In the closed position of the valve, the valve body 4 acts on the outflow-side circumferential edge region, which is formed as a valve seat 3, of the fluid line piece 2 and provides sealing there, such that the pressure at the outflow side can rise no further.

Since the valves illustrated here vary their valve opening as a function of the pressures and counterpressures acting in opposite directions on the valve body 4, these valves react rapidly to a pressure building up on the outflow side.

It may additionally be possible for the valve body 4 to be moved from its open position into its closed position counter to a restoring force. Here, a restoring force may also be provided by a compressible air cushion situated in the annular chamber 15 which is bounded by the housing inner circumference and the outer circumference of the fluid line piece 2 and which is situated on the opposite side of the sliding piece 5 from the closure piece 7.

In the valve embodiment 113 shown in FIGS. 13 and 15, the valve body 4 is moved only by the pressure forces acting in opposite directions, and the annular chamber 15 is connected to the environment by means of a ventilation duct 16. In contrast, in the valve embodiments 101 and 105 shown in FIGS. 1, 3, 5, 7, 9 and 11, the valve body 4 can be moved into its closed position counter to the restoring force of a restoring spring 17. In contrast, in the valve 117 shown in FIGS. 17 and 18, it is provided that the valve body can be moved into its open position or into its closed position from the preferred starting position shown in FIG. 17. Since the restoring forces imparted in this case by restoring springs 17, 17' act on the valve body 4 of the valve 117 at both sides, the valve body 4 is, in FIG. 17, held in a preferred intermediate position. Here, the valve body 4 of the valve 117 can move either in the direction of the closed position or in the direction of the open position counter to the restoring force of one of the restoring springs 17, 17', as a function of the respectively prevailing pressure difference, as a result of which the ring seals 9, 11 are exercised.

Figure 1:
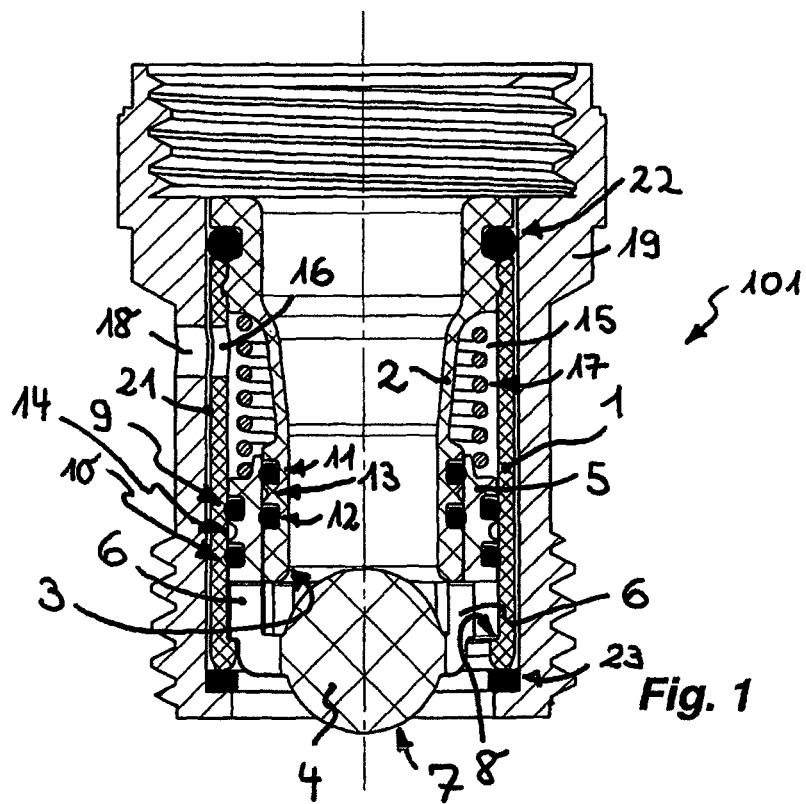
FIG. 1 shows, in its open position, a valve which is designed as a pressure limiter and the associated valve housing designed as an insert cartridge which can be inserted into a sanitary supply line and in particular into a water line, wherein the valve is shown in a longitudinal section through section plane I-I in FIG. 2.
Figure 4:
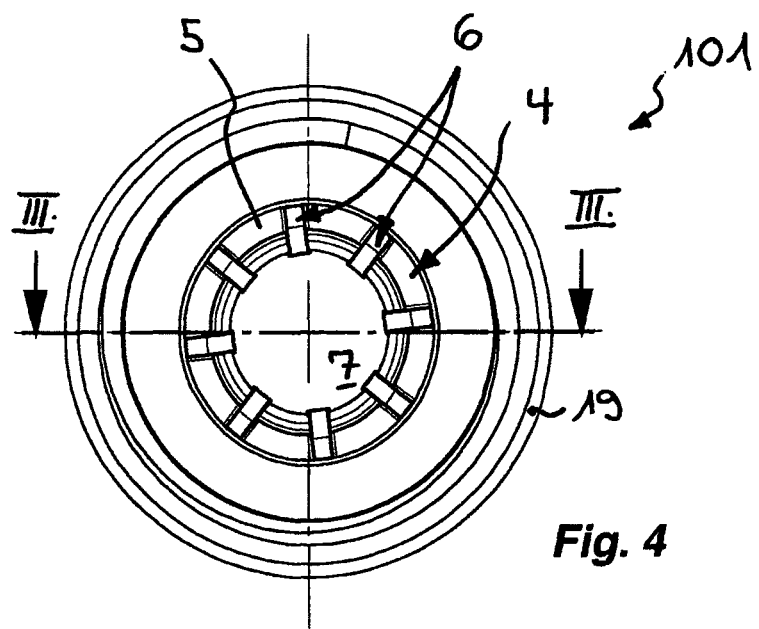
FIG. 4 shows, in a plan view of its outflow side, the valve from FIGS. 1 to 3 in its closed position.
Figure 3:
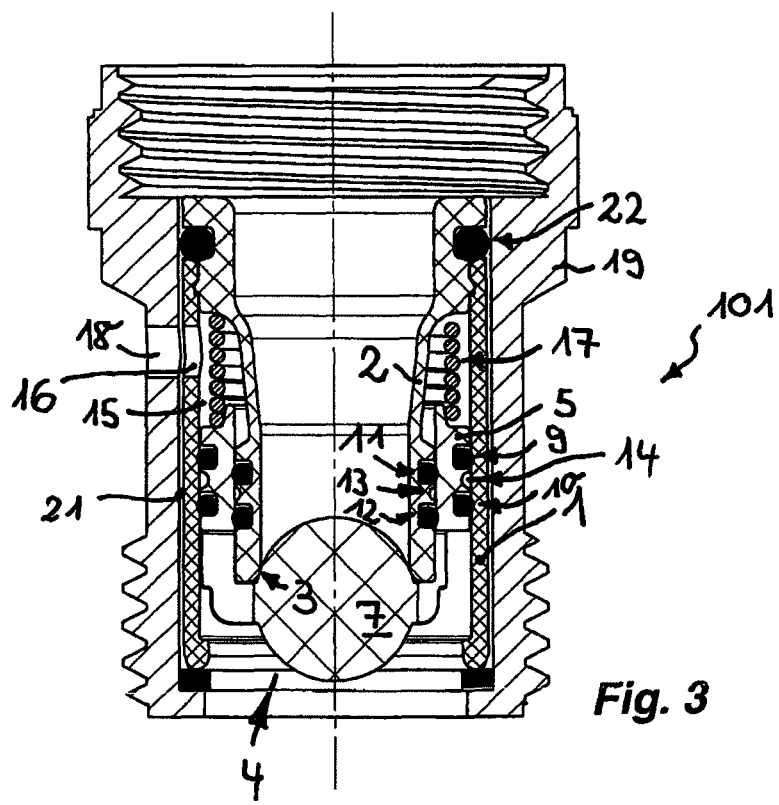
FIG. 3 shows, in longitudinal section in the section plane III-III from FIG. 4, the valve from FIGS. 1 and 2 in its closed position.
Figure 6:
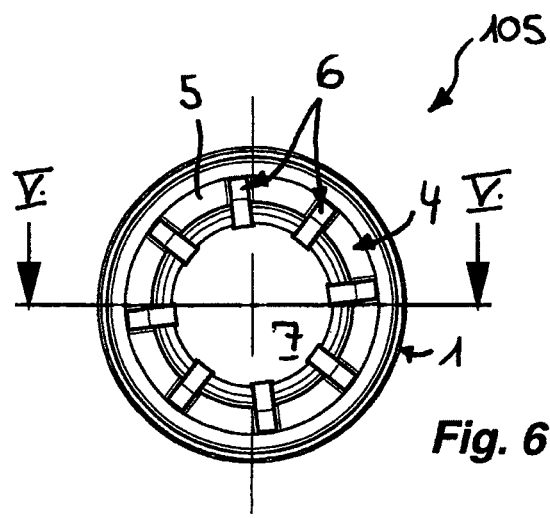
FIG. 6 shows, in a plan view of its outflow side, the valve from FIG. 5 likewise in its closed position.
Figure 5:
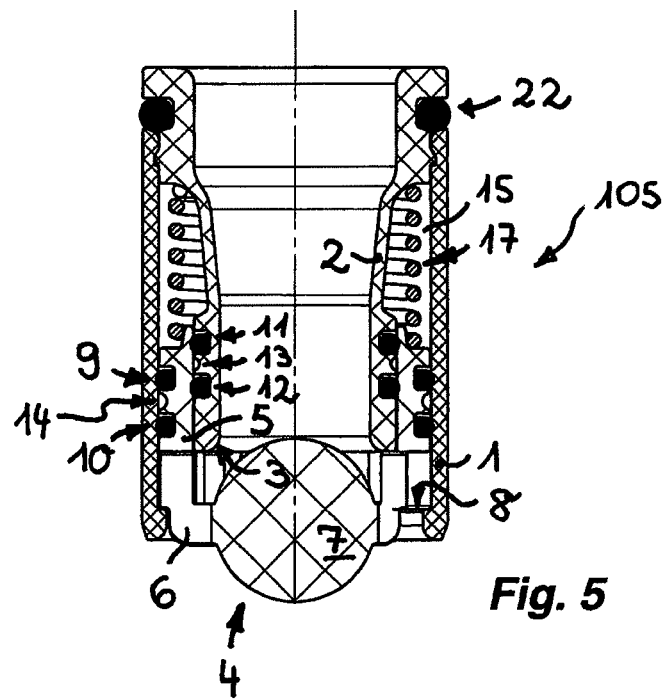
FIG. 5 shows, in longitudinal section through section plane V-V in FIG. 6, a valve similar to that in FIGS. 1 to 4, the valve body of which can be moved from its open position, shown here, into a closed position counter to an air cushion.
Figure 8:
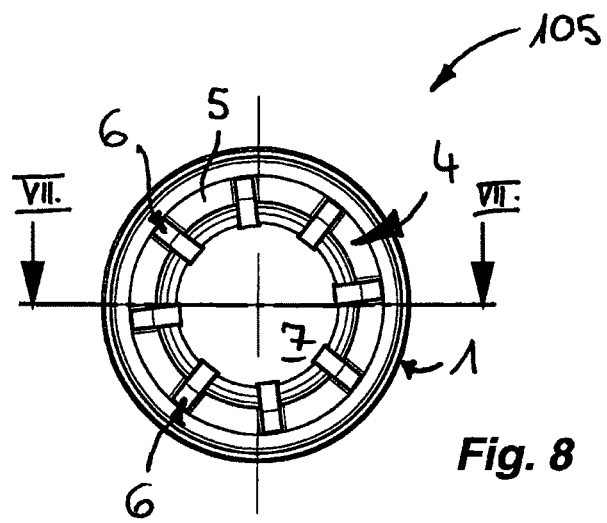
FIG. 8 shows, in a plan view of its outflow side, the valve from FIGS. 5 to 7 illustrated in its closed position.
Figure 7:
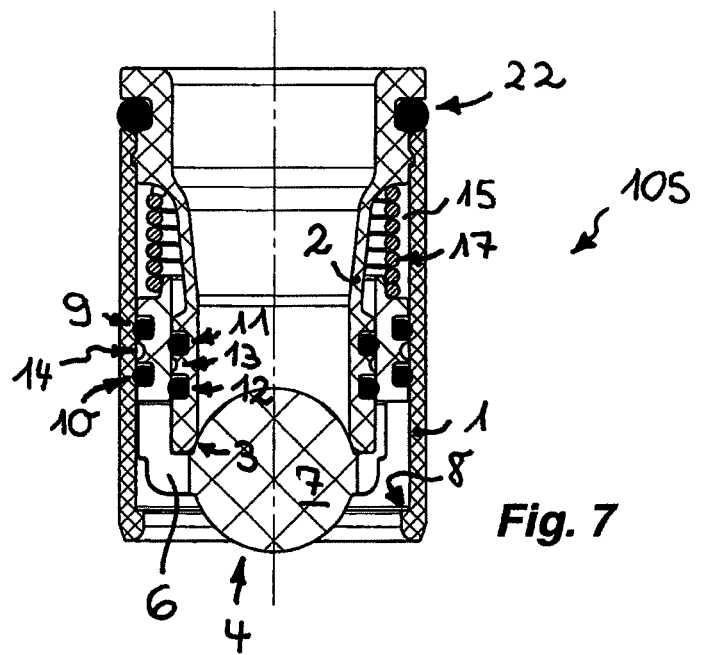
FIG. 7 shows, in longitudinal section in the section plane VII-VII in FIG. 8, the valve from FIGS. 5 and 6 in its closed position.
Figure 10:
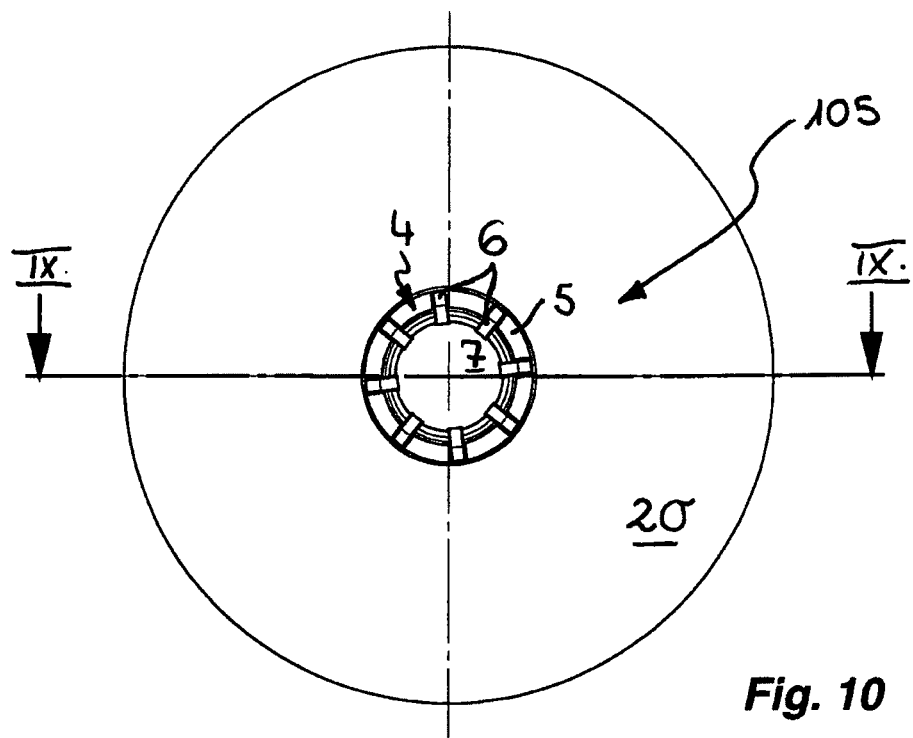
FIG. 10 shows, in a plan view of its outflow side, the valve shown in the exemplary application as per FIG. 9, wherein here, too, the valve is illustrated in its open position.
Figure 9:
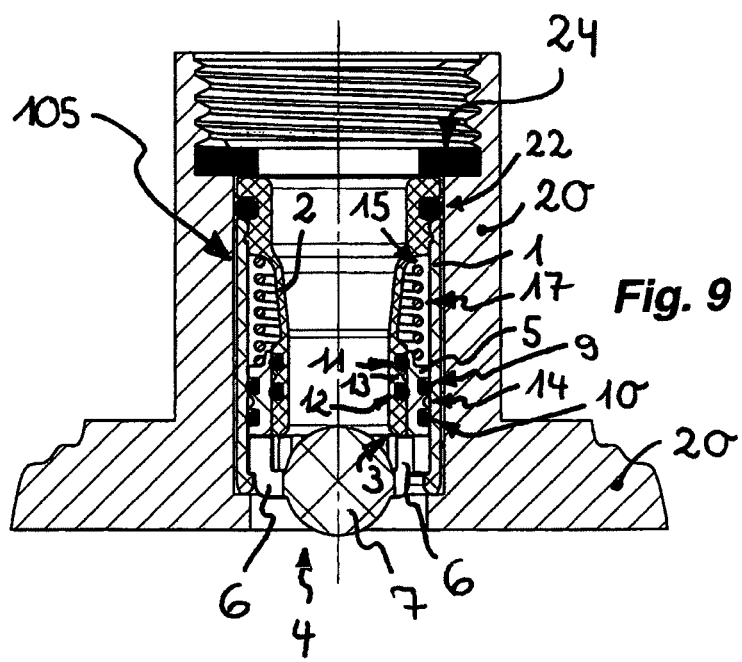
FIG. 9 shows, in a longitudinal section in section plane IX-IX from FIG. 10, the valve from FIGS. 5 to 8 in its open position in an exemplary application.
Figure 12:
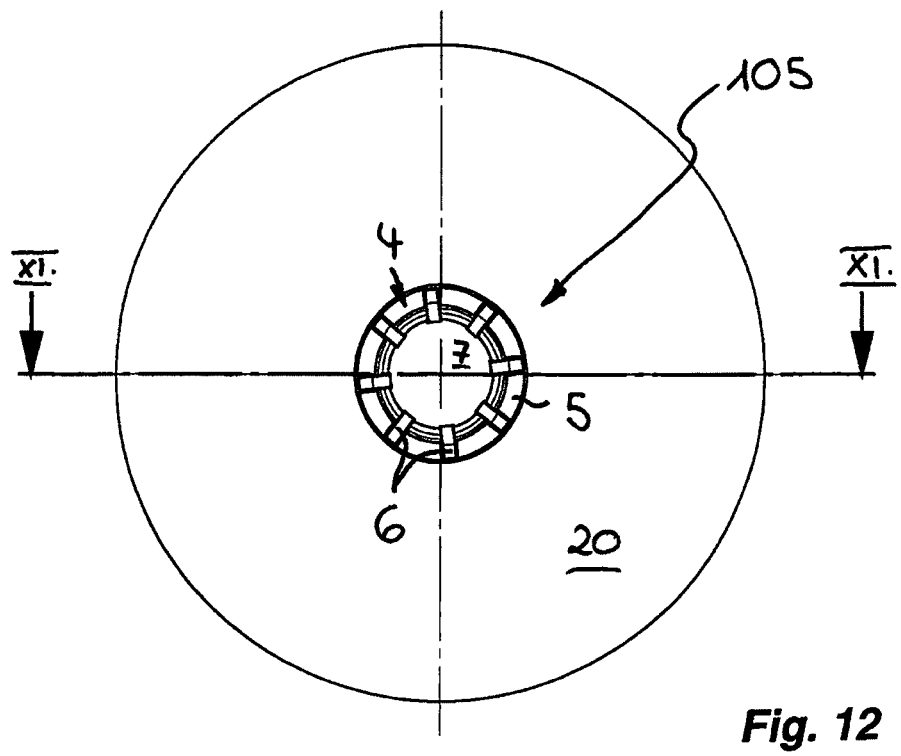
FIG. 12 shows, in a plan view of its outflow side, the valve from FIGS. 9 to 11 in its closed position in an exemplary application.
Figure 11:
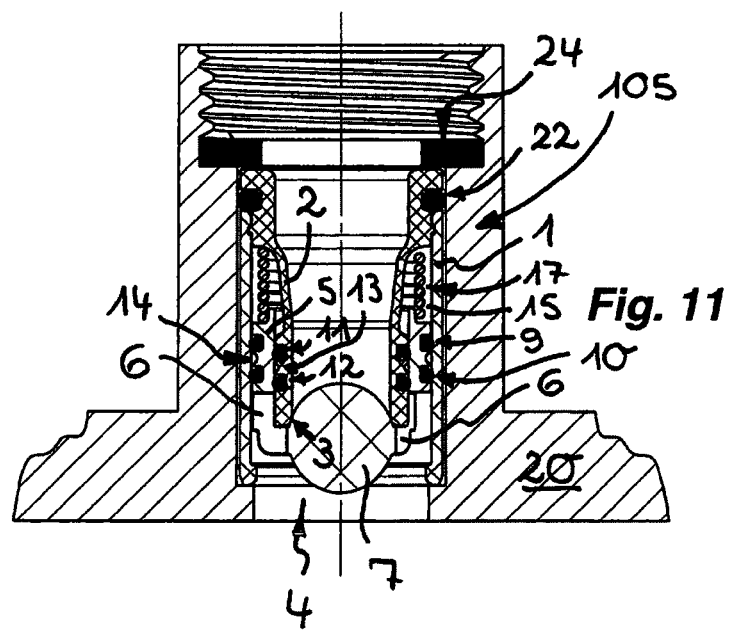
FIG. 11 shows the valve shown in the longitudinally-sectioned exemplary embodiment from FIGS. 9 and 10 in its closed position, wherein the valve is shown in the section plane X-X from FIG. 12.

Whereas, in the valve embodiment 101 shown in FIGS. 1 and 3, the annular chamber 15 which accommodates the restoring spring 17 is connected to the environment via the ventilation duct 16 and via a ventilation opening 18, which is connected to the ventilation duct 16, in the cartridge receptacle which receives the valve embodiment 101, it is the case in the valve embodiment 105 shown in FIGS. 5, 7, 9 and 11 that the air cushion enclosed in the annular chamber 15 additionally provides a restoring force.

In addition to or instead of this, it is also conceivable, for example, for a ring element to be arranged in the annular chamber 15, which ring element serves to provide a restoring force and may in particular be produced from closed-cell foamed material.

In the valve embodiments 101, 105 and 113 illustrated here, it is ensured that the rear side, which is not exposed to the counterpressure, of the sliding piece 5 is at all times subjected to atmospheric pressure, or to a pressure which is lower than that which acts on that side of the sliding piece 5 which is exposed to the counterpressure.

In the valve embodiments 101 and 105 shown in FIGS. 1 to 12, the valve housing 1 is designed as an insert cartridge which can be removably inserted into a cartridge receptacle. This cartridge receptacle may then be designed for example as a pipe piece shown in FIGS. 1 to 4 or—in accordance with customer-specific demands—also as a pipe stub 20 shown in FIGS. 9 to 12.

As shown in FIGS. 1 to 4, the annular chamber 21 which remains between the valve housing 1 and the inner circumference of the pipe piece 19 is sealed off at both sides by ring seals 22, 23 and is connected to the environment via the ventilation opening 18.

In the exemplary application shown in FIGS. 9 to 12, the valve housing 4 is inserted, up to an insertion stop formed here as an annular shoulder, into a hole of the cartridge receptacle formed as a pipe stub 20, and is secured in the inserted position by means of a sealing ring 24 at the inflow side.

In the valve embodiment 113 shown in FIGS. 13 to 15, the valve is a constituent part of an assembly which comprises a shower spray head 25 and, at the connection side, a ball joint 26. Here, the valve housing 1 of the valve embodiment 113 shown in FIGS. 13 to 15 is designed as a joint ball of the ball joint 26.

The shower spray head 25, which is intended to generate a shower jet pattern formed from a multiplicity of thread-like individual jets, has a corresponding multiplicity of spray openings 27 which have a relatively small clear opening cross section. Since these relatively small spray openings 27 can become easily blocked by limescale or dirt accumulations, there is the risk of an undesired pressure building up in the shower spray head 25. In particular, in the case of the shower spray head 25 formed in this case from two shower spray head parts 28, 29 latched to one another, there is the risk that such an undesired pressure can cause a deformation or even a fracture of the thin-walled shower spray head 25. Such an undesired pressure is in this case now prevented by the valve embodiment 113. Since the valve embodiment 113 also varies its valve opening as a function of the pressures and counter-pressures acting on the valve body 4 in opposite directions, the valve embodiment 113 reacts rapidly to a pressure building up at the outflow side. Since the valve embodiment 113 moves into its closed position in the event of a significantly rising pressure at the outflow side, pressure-induced malfunctions and damage to the shower spray head 25 are effectively counteracted.

It is self-evident that the valve which serves here as a pressure limiter can also be used advantageously in other applications. For example, the valve illustrated here, which may also be used in a gas line or some other fluid line, may for example also be used in non-pressurized water heaters, in coffee machines or in automated beverage dispensers in order, in those applications too, to counteract an undesired counterpressure.

The invention claimed is:

1. A valve comprising a valve housing (1), having an interior space in which a fluid line piece (2) is provided having an outflow-side circumferential edge region that forms a valve seat (3) for a valve body (4), said valve body (4) can be moved between an open position and a closed position firstly by a pressure, which acts on the valve body (4), of the fluid flowing in through the fluid line piece (2) and secondly by a counter-pressure, in said closed position the valve body (4) acts on the outflow-side circumferential edge region of the fluid line piece (2), the counterpressure is adapted to act on the valve body (4) counter to a regular throughflow direction, a sliding guide having a guide path is assigned to the valve body (4) and is bounded by a housing inner circumference of the valve housing (1) and an outer circumference of the fluid line piece (2), the valve body (4) has at least one annular sliding piece (5), which is displaceably guided in the sliding guide, and a closure piece (7) which acts on the valve seat (3) in the closed position, and the closure piece (7) and the sliding piece (5) are connected to one another by connecting webs (6) which delimit throughflow openings therebetween wherein the sliding travel of the valve body (4) is delimited by at least one stop in the valve housing (1), the stop interacts with a counterpart stop on the valve body (4), and at least one of the stop is formed as an annular shoulder (8) provided on the housing inner circumference, or the counterpart stop is arranged on the connecting webs (6).

2. The valve as claimed in claim 1, wherein at least the closure piece (7) of the valve body (4) has a spherical shape or, at least in a partial region which acts on the valve seat (3), a spheroidal or rounded shape.

3. The valve as claimed in claim 1, wherein the valve body (4) can be moved from a starting position into at least one of the open position or the closed position counter to a restoring force.

4. The valve as claimed in claim 3, wherein at least one rubber-elastic or resiliently elastic element provides the restoring force.

5. The valve as claimed in claim 1, wherein the valve housing (1) is a cartridge housing.

6. The valve as claimed in claim 1, wherein the valve is a pressure limiter.

7. The valve as claimed in claim 1, wherein an aerated jet regulator is positioned downstream of the valve in a flow direction, said jet regulator is arranged in a water outlet of a sanitary outlet fitting.

8. A valve comprising a valve housing (1) having an interior space in which a fluid line piece (2) is provided having an outflow-side circumferential edge region that forms a valve seat (3) for a valve body (4), said valve body (4) can be moved between an open position and a closed position firstly by a pressure, which acts on the valve body (4), of the fluid flowing in through the fluid line piece (2) and secondly by a counterpressure, in said closed position the valve body (4) acts on the outflow-side circumferential edge region of the fluid line piece (2), the counterpressure is adapted to act on the valve body (4) counter to a regular throughflow direction, a sliding guide having a guide path is assigned to the valve body (4) and is bounded by a housing inner circumference of the valve housing (1) and an outer circumference of the fluid line piece (2), the valve body (4) has at least one annular sliding piece (5), which is displaceably guided in the sliding guide, and a closure piece (7) which acts on the valve seat (3) in the closed position, and the closure piece (7) and the sliding piece (5) are connected to one another by connecting webs (6) which delimit throughflow openings therebetween wherein at least one ring seal (9, 10; 11, 12) or slide ring seal is provided at least one of between the housing inner circumference and the valve body (4) or between the valve body (4) and the outer circumference of the fluid line piece (2).

9. The valve as claimed in claim 8, wherein the at least one ring seal or slide ring seal (9; 11) is a lip seal.

10. The valve as claimed in claim 9, wherein the lip seal is held in an annular groove provided on a circumference of the valve body, and bears sealingly with a free circumferential edge region of at least one sealing lip against the housing inner circumference of the valve housing (4).

11. A valve comprising a valve housing (1) having an interior space in which a fluid line piece (2) is provided having an outflow-side circumferential edge region that forms a valve seat (3) for a valve body (4), said valve body (4) can be moved between an open position and a closed position firstly by a pressure, which acts on the valve body (4), of the fluid flowing in through the fluid line piece (2) and secondly by a counterpressure, in said closed position the valve body (4) acts on the outflow-side circumferential edge region of the fluid line piece (2), the counterpressure is adapted to act on the valve body (4) counter to a regular throughflow direction, a sliding guide having a guide path is assigned to the valve body (4) and is bounded by a housing inner circumference of the valve housing (1) and an outer circumference of the fluid line piece (2), the valve body (4) has at least one annular sliding piece (5), which is displaceably guided in the sliding guide, and a closure piece (7) which acts on the valve seat (3) in the closed position, and the closure piece (7) and the sliding piece (5) are connected to one another by connecting webs (6) which delimit throughflow openings therebetween wherein two ring seals (9, 10; 11, 12) or slide ring seals, which are spaced apart from one another, are provided at least one of on the sliding piece (5) or on the outer circumference of the fluid line piece (2), between said ring seals or slide ring seals there is provided at least one annular groove (13, 14) formed as a grease chamber.

12. A valve comprising a valve housing (1), having an interior space in which a fluid line piece (2) is provided having an outflow-side circumferential edge region that forms a valve seat (3) for a valve body (4), said valve body (4) can be moved between an open position and a closed position firstly by a pressure, which acts on the valve body (4), of the fluid flowing in through the fluid line piece (2) and secondly by a counterpressure, in said closed position the valve body (4) acts on the outflow-side circumferential edge region of the fluid line piece (2), the counterpressure is adapted to act on the valve body (4) counter to a regular throughflow direction, a sliding guide having a guide path is assigned to the valve body (4) and is bounded by a housing inner circumference of the valve housing (1) and an outer circumference of the fluid line piece (2), the valve body (4) has at least one annular sliding piece (5), which is displaceably guided in the sliding guide, and a closure piece (7) which acts on the valve seat (3) in the closed position, and the closure piece (7) and the sliding piece (5) are connected to one another by connecting webs (6) which delimit throughflow openings therebetween wherein the valve housing (1), in an inflow-side partial region of the sliding guide, is open to the environment.

\* \* \* \* \*